Sept. 8, 1970   R. H. ROBICHAUD ET AL   3,527,980
DIGITAL VARIABLE INTENSITY DISPLAY
Filed March 28, 1968   3 Sheets-Sheet 2
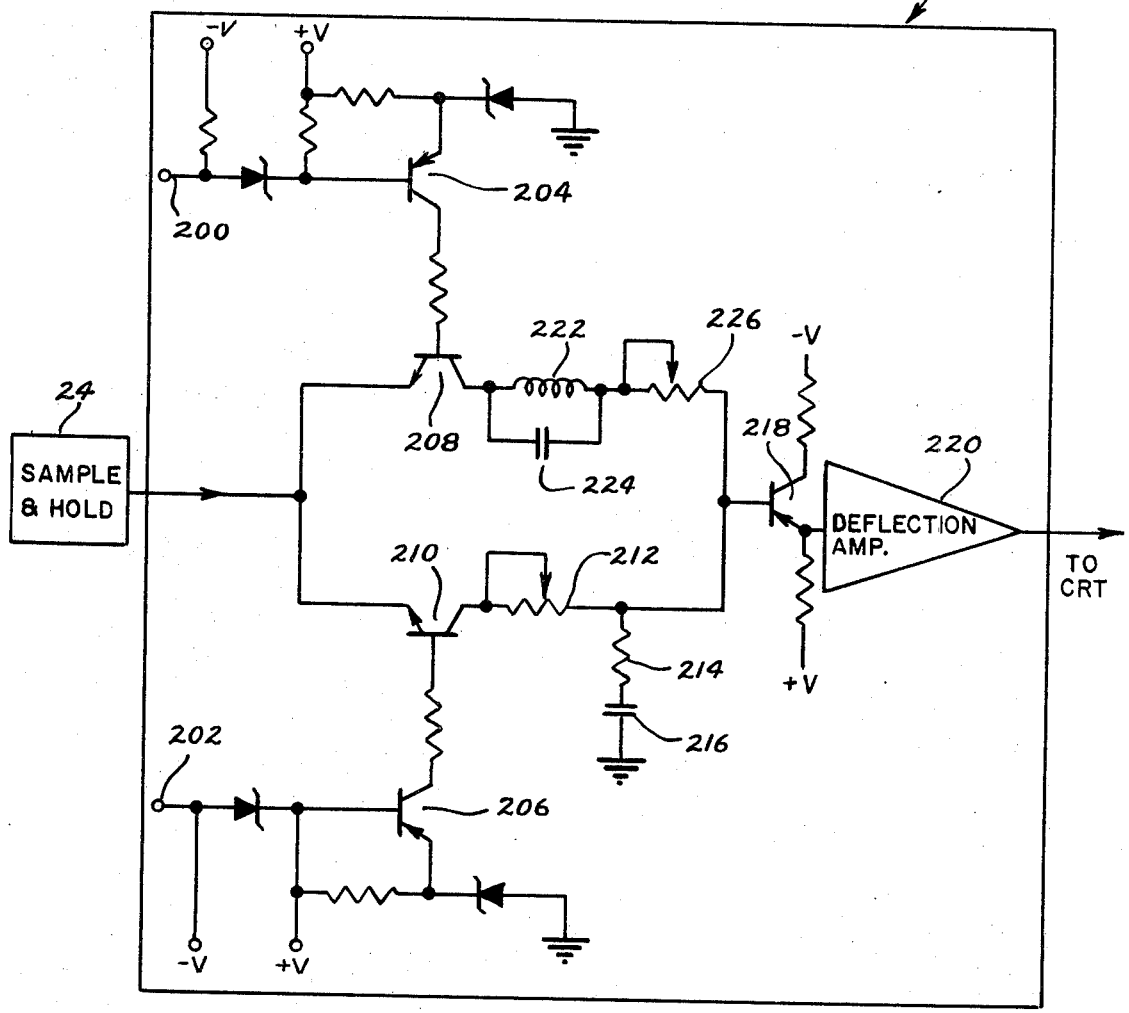
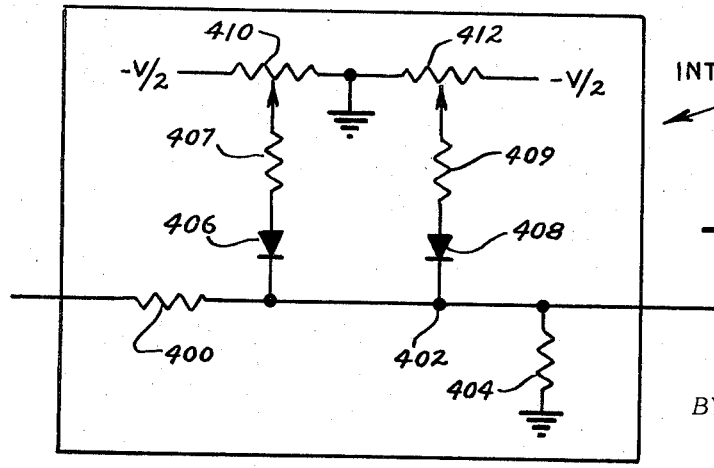
INVENTORS
RICHARD H. ROBICHAUD
H. PHILIP PETERSON
BY Bruce A. Nemer
AGENT

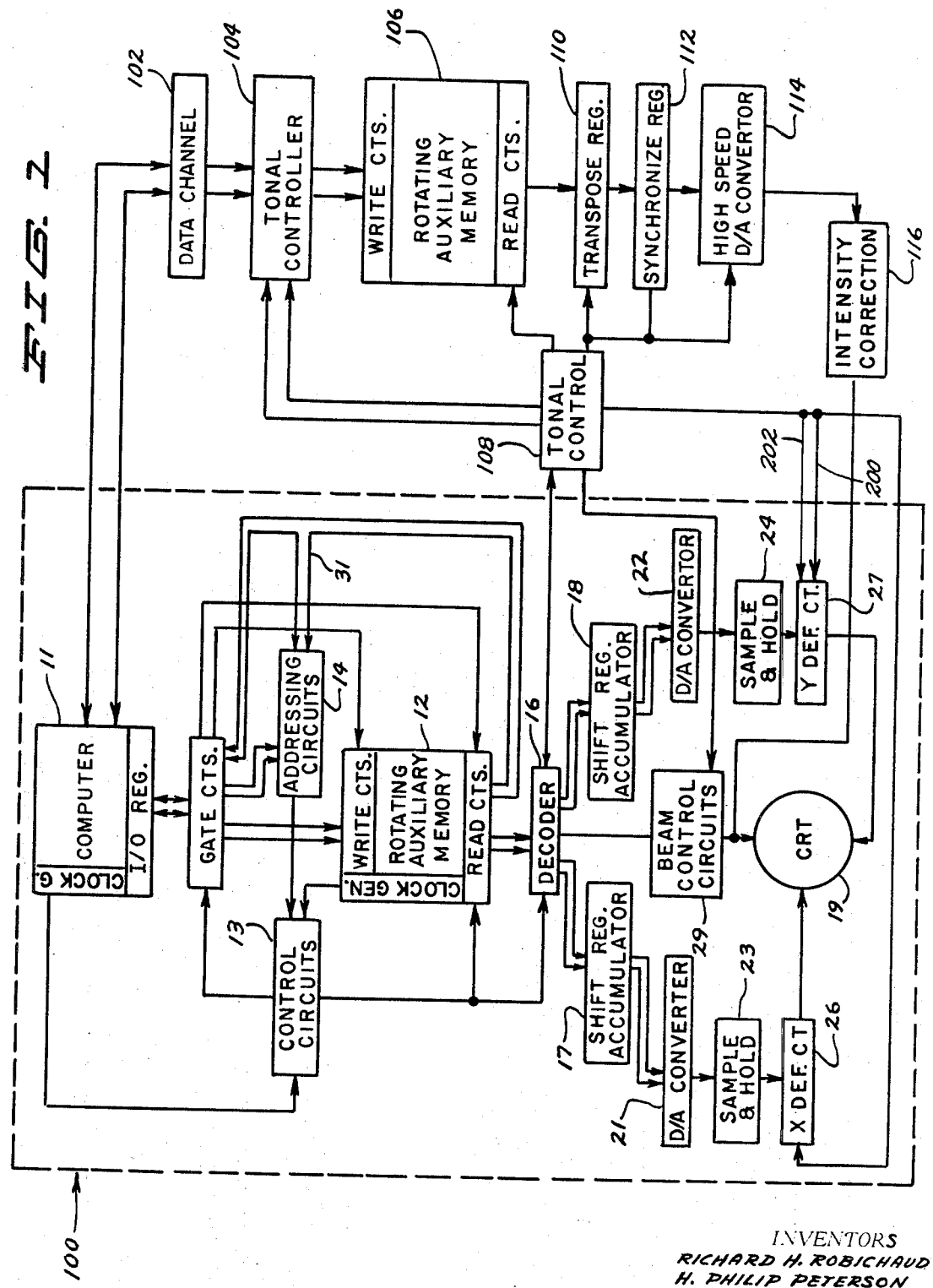

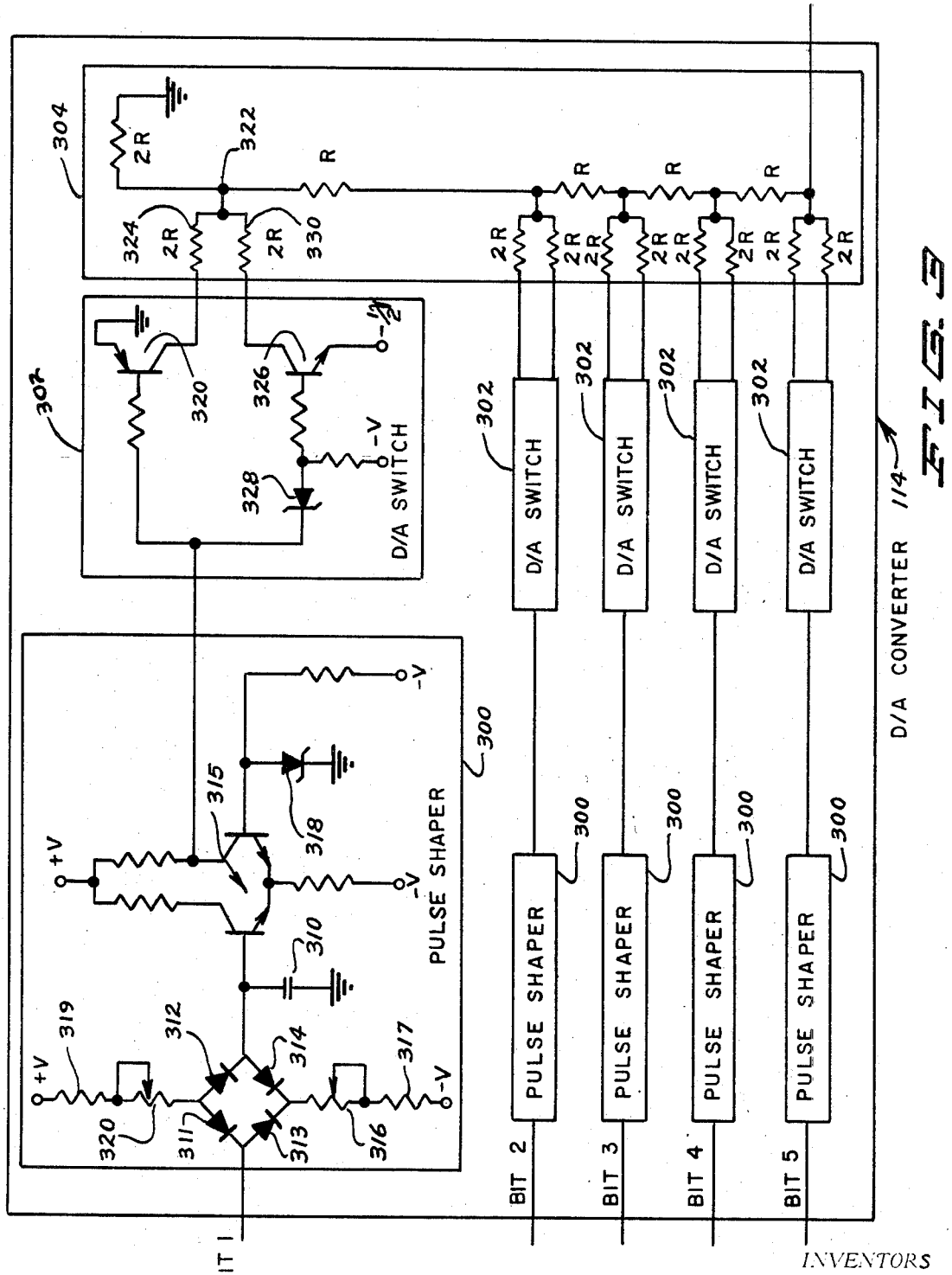

United States Patent Office 3,527,980
Patented Sept. 8, 1970

3,527,980
DIGITAL VARIABLE INTENSITY DISPLAY
Richard H. Robichaud, Burlington, and Harold Philip Peterson, Woburn, Mass., assignors to Control Data Corporation, Minneapolis, Minn., a corporation of Minnesota
Filed Mar. 28, 1968, Ser. No. 716,883
Int. Cl. H01j 29/52, 29/70
U.S. Cl. 315—22                               11 Claims

ABSTRACT OF THE DISCLOSURE

An improvement to two dimensional displays created solely from digital information for providing a third dimension from further digital information is disclosed where the third dimension is created by modulating the local brightness of two dimensional information displayed in accordance with the further digital information. A memory associated with the two dimensional display is expanded and the intensity information associated with the two dimensional deflection information is stored. The deflection information and the intensity information are then read from memory, synchronized, converted to analog signals, and used to control the cathode ray tube.

BACKGROUND

Two dimensional displays have found many uses, especially in association with computers. For example, the display may be used to communicate with the computer, to display responses from the computer, to provide a means for altering information stored in the computer, or to retrieve information stored in the computer. Many types of two dimensional displays have been built to accomplish these purposes. Character generating displays, point generating displays, and line generating displays are examples of three types.

As computing systems have become more sophisticated and the data to be displayed has correspondingly become more sophisticated, however, the need for a three dimensional display has arisen. A two dimensional display of complex or pictorial data is inadequate. Weather maps, high density contour maps and moon surface pictures are examples of complex or pictorial data which are better displayed in three dimensions.

In addition to better presenting complex or pictorial data, a three dimensional display created solely from digital information is useful in the display manipulations possible. For example, the raster size and shape and the period of the display may be completely digitally generated, controlled, and modified by programming techniques; portions of the display can be easily retrieved and enlarged by use of light pens or other common techniques for communicating with a computer; the display may be shifted in perspective by a computer program since the raster shape and size are digitally controlled; and a video picture may be combined with an analyzed with alpha-numeric data.

The present invention teaches such a display created solely from digital information, where the word digital as used in this specification means quantized information in a form other than analog. The local brightness or local display intensity is controlled according to digital information to form a tonal, half tone, or variable intensity, display.

DESCRIPTION

It is an object of the present invention to provide a three dimensional display created solely from digital information with local brightness or display intensity as the third dimension.

It is a further object of the present invention to provide a three dimensional display which may be altered, controlled, and modified by programming techniques.

These and further objects and advantages of the present invention will become clearer in the light of the following detailed description of an illustrative embodiment of the invention and from the appended claims.

The illustrative embodiment may best be described by reference to the accompanying drawings where:

FIG. 1 shows a block diagram of a variable intensity display constructed according to the teachings of the present invention;

FIGS. 2 through 4 show preferred embodiments of blocks within FIG. 1.

In FIG. 1, a two dimensional display generally designated as 100 is shown within dashed lines. This display is taught by Pat. No. 3,205,344 (the patent) which issued on Sept. 7, 1965 in the name of Taylor, Pughe and Adams. The teachings of the patent will not be repeated except where there is a modification or an interaction with the improvement dissclosed by the present invention. In its elemental form this improvement requires over and above the apparatus disclosed in the patent, means for converting digital data representative of beam intensity into an analog intensity signal (shown in the preferred embodiment of FIG. 1 as registers 110, 112, and D/A converter 114); means for applying the intensity signal to the cathode ray tube (shown in the preferred embodiment of FIG. 1 as intensity correction 116 and part of beam control circuit 29); and means for controlling and timing the D/A conversion, the synchronization of the deflection data and intensity data and the application of the intensity signal to the cathode ray tube electron beam (shown in the preferred embodiment of FIG. 1 as tonal control 108). In addition, the preferred embodiment includes further memory means 106 for storing intensity data; and means for entering and retrieving intensity data to and from the further memory means (shown in FIG. 1 as data channel 102, and tonal controller 104).

Although many forms of memory means could be used, including magnetic disk or magnetic cores, a drum memory was chosen for the preferred embodiment. By sharing the same drum between memory 12 and memory 106, the problem of synchronizing deflection data with intensity data is partially solved by the mechanical interconnection of the memories.

In the patent, the electron beam is deflected under control of an initial beam address followed by a plurality of incremental addresses thereby creating a plurality of line segments. In this way, an almost infinite variety of patterns can be traced with the beam. However, in the preferred embodiment of this invention, a fixed pattern or raster was selected comprising 240 interlaced lines where each line of the raster comprises 63 line segments and each line segment is subdivided into 16 sub-segments, each of which may assume 32 different intensity levels.

Since each sub-segment is capable of 32 levels of intensity, five bits of data are stored per sub-segment. Since there are 16 sub-segments per line segment, there are 16 five-bit fields or 80 bits per intensity word. Since each 80 bit intensity word is associated with a particular line segment, there is one deflection word per intensity word. To return to FIG. 1. A data channel 102 is shown providing a data connection between computer 11 and a tonal controller 104. Data channel 102 and tonal controller 104 provide for the transfer of binary information between computer 11 and a rotating auxiliary memory or further memory 106. Transpose register 110 provides 80 bits of storage capacity from which disassembly into five bit bytes is performed during transfer to synchronize register 112 and subsequent digital to analog conversion by high speed D/A converter 114.

Tonal control 108 is the link between all of the aforementioned pieces of hardware. Upon receipt of a signal from memory 12 via decoder 16 ordering the equipment to operate in tonal mode, tonal control 108 initiates the performance of or performs the following functions:

(1) Transfers beam intensity control to the path from intensity correction block 116.

(2) Switches from the normal exponential ramp provided by the deflection circuits of the patent to the linear ramp required by this invention to provide intensity cells of equal length.

(3) Enables reading from memory 106 into register 110.

(4) Provides the timing and gating signals required to disassemble data from register 110 in five-bit groups and transfer each five-bit group in turn to register 112.

As will be obvious to one skilled in the computer art, tonal control 108 must contain several control elements plus a timing source. The control elements may take the form of control flip-flops and the timing source may be a timing chain consisting of flip-flops. The analog information is then passed through intensity correction 116 and provided to the intensity input of cathode ray tube (CRT) 19. Using the teachings of the patent, a letter A can be displayed of one intensity, and a second letter B can be displayed of a second intensity. Using the teachings of the present invention, each letter can also be displayed with shading, for example one extremity bright and the other extremity dim with a gradual change in intensity between the extremities.

In FIG. 2, a preferred embodiment of Y deflection circuit 27 of the patent is shown incorporating a change needed by the present invention. A similar change in X deflection circuit 26 is also necessary. Complementary signals, shown schematically in FIG. 1 entering Y deflection circuit 27 from tonal control 108 are applied to control inputs 200 and 202 of control transistors 204 and 206 which in turn control two transistors 208 and 210. Transistors 208 and 210 function as in-line switches; thus, only one of them is conducting at a given time. That is, a signal is provided to either control input 200 or 202—not both simultaneously. If transistor 210 is conducting, a pulse entering Y deflection circuit 27 is conducted to the R-C circuit comprising variable resistor 212, resistor 214, and capacitor 216. This RC circuit integrates the pulse input to form an exponentially changing wave form which is conducted by emitter follower transistor 218 to deflection amplifier 220 and to the Y deflection plates of CRT 19. This path illustrates the technique used by the patent to provide a deflection wave form. Since the requirement of the embodiment taught by the patent was to proceed as quickly as possible between two points, an exponentially changing wave form was sufficient. Since the teachings of the present invention allow 16 discrete intensity picture cells as the deflection circuitry causes a shift in the CRT beam between a first point and a second point, a linear deflection wave form is desired to avoid having the deflection wave form modulate the display intensity. Therefore, in the tonal mode of the present invention, no input is provided to control input 202 and transistor 210 is rendered nonconducting by its associated bias supplies. An input is then provided to control input 200 to cause transistor 208 to conduct the pulse input from the sample and hold circuit through the LC circuit comprising inductor 222, capacitor 224, and variable resistor 226. A pulse conducted through this path is integrated to provide a linear deflection wave form. Variable resistor 226 adjusts the slope of the deflection wave form over a limited range.

In FIG. 3, a preferred embodiment of high speed D/A converter 114 is shown. As will be later explained, a group or word comprising 5 binary digits (bits) is transferred from synchronize register 112 to D/A converter 114. The path of these five bits through D/A converter 114 is shown within FIG. 3. Each bit is first passed through a pulse shaper 300 and to a D/A switch 302. The five D/A switches 302 then provide their output digital signals to a ladder network 304. The output of ladder 304 is then applied to intensity correction circuit 116 and ultimately to CRT 19.

In FIG. 4 a preferred embodiment of a gamma intensity correction circuit such as intensity correction 116 of FIG. 1 is shown. A resistor 400 applies the input signal to a junction point 402. A second resistor 404 is connected between junction point 402 and ground. The output signal is taken from junction point 402. Resistors 400 and 404 comprise a voltage divider network which provides a portion of the input signal voltage to the output. Two diodes 406 and 408 are connected through resistors 407 and 409 to the arms of two variable resistors 410 and 412. Variable resistors 410 and 412 are connected between two voltage supplies to provide a variable voltage to the anodes of diodes 406 and 408 depending on the position of the arms.

OPERATION

Generally, two dimensional display 100 of FIG. 1 operates as follows: a digital signal indicating the origin of the display is read from memory 12, decoded in decoder 16, and provided through the X and Y deflection circuits to locate the CRT beam on the face of CRT 19; and subsequent binary information is read from memory 12, decoded by decoder 16, and used to provide incremental deflections to the CRT beam. The smallest incremental deflection is five mils. Thus, to create the letter A in the center of the CRT face, the beam would first be directed to the position of one extremity of the letter, and variable length and direction increments which are multiples of the five mil basic deflection are taken until the letter is completed. The intensity of the display from the selection of one origin point to the selection of the next origin point may be set at one of three intensity levels. All of this is explained in the patent.

Generally, to initiate the tonal or brightness modulated mode of the present invention, a binary signal is provided by decoder 16 to tonal control 108 to activate it. Tonal control 108 then disables beam control circuits 29, controls X deflection circuit 26 and Y deflection circuit 27, by switching from exponential to linear sweep deflection, and controls the transfer of intensity information from memory 106 through transpose register 110, synchronize register 112, D/A converter 114, and to the intensity input of CRT 19. Since beam control circuit 29 of the patent is disabled, the intensity of the CRT beam is completely under the control of the intensity information stored within memory 106.

More particularly in the preferred embodiment, after the information within decoder 16 actuates tonal control 108, the information issuing from memory 12 changes in character from repeated origin locations and variable length and direction incremental commands to a continuous scan. The raster starts in the upper left hand corner of the 22 inch diameter CRT tube used, incrementally traces down the CRT tube face 1008 picture cells, turns around, traces up, and repeats. When 240 interlaced lines have been incrementally represented in this way, the beam is directed to begin another group of 240 interlaced lines until an area representing a program controlled area is covered. A complete display may then be created by coordinating this deflection information as stored within memory 12 and the intensity information stored within memory 106. As the first deflection increment is displayed, an 80 bit word comprising 16 five bit groups is read from memory 106 in parallel and transferred to transpose register 110 under the control of tonal control 108. Each five bit group represents one of a possible 32 brightness levels at one point in the final video picture. The information is then removed from transpose register 110 to synchronize register 112 serially in the five bit groups. Synchronize register 112 is designed to properly provide the five bit groups to D/A converter 114 so that each five bit group is converted to an analog signal. The serial chain of five bit groups is converted to a continuous time varying analog signal, is operated upon by intensity correction circuit 116, and is used to modulate the beam intensity of CRT 19. The digital timing is such that as one increment of deflection is displayed the 16 intensity portions pass from D/A converter 114 and modulate the CRT beam. Thus each incremental deflection may have 16 intensity or brightness cells impressed upon it. Each intensity cell comprises one of 32 possible intensities because a five bit data word is used. It is now apparent that the local brightness modulated by the present invention is the brightness of a cell.

In the preferred embodiment, memory 106 is a rotating drum having a surface adapted for the storage of digital information. Many such drum memories are well known to those skilled in the art. The drum of the preferred memory makes 30 complete revolutions per second, which allows the display to be refreshed 30 times per second. A 600 kilocycle per second clock track in conjunction with a phase modulated signal allows 20,000 bits to be recorded in each track around the drum. Since 16 groups of five bits each are read from memory simultaneously, 320,000 five bit words are recorded around the surface of the drum for the intensity portion of every tonal picture displayed in the preferred embodiment.

The deflection portion of the information displayed is stored in memory 12. In the patent, memory 12 is a disc storage device. In the preferred embodiment of the present invention, however, additional tracks of a drum memory, such as that described in conjunction with memory 106, are used. The logic changes necessary in the embodiment of the patent to allow for this change in memory types is within the skill of one familiar with the computing art. A common memory is desirable to eliminate the need for buffer registers to coordinate the two memories.

If a disc memory is desired, it may be used. A disc memory system, for example, may store both the deflection and the intensity information on several discs. The teachings of the present invention are not altered. In fact, many other types of memories may be used within the teachings of the present invention.

Specific embodiments of transpose register 110 and synchronize register 112 will be obvious to one skilled in the art. Transpose register 110 merely provides the timing interface between the read circuits of memory 106 and the remainder of the circuitry of the display. Synchronize register 112 accepts the 16 five bit groups from transpose register 110 in parallel and provides each of these groups serially to D/A converter 114. Many embodiments of these two registers will be obvious to one skilled in the computing art.

Specific embodiments of data channel 102 and tonal controller 104 will also be immediately obvious to one skilled in the computing art. Both are intended to provide a timing interface between computer 11 and memory 106 to record the intensity information in memory 106. Any means of recording the intensity information in memory 106 is sufficient to practice the present invention; however, placing the recording of information in memory 106 under the control of computer 11 allows the manipulation and change of the display, previously explained.

The operation of the D/A converter may now be explained. Since a 600 kilocycle per second clock rate is used on the magnetic drum and 16 intensity cells must be serially supplied for each increment of deflection, the D/A converter operates at 9.6 megacycles per second. This is beyond the capability of ordinary D/A converters, and a special D/A converter was designed for this display. It is shown in FIG. 3. The basic operation of providing digital signals to various points of a ladder network such as ladder 304 through a D/A switch such as 302 is familiar to those skilled in the art. The additional operation provided by pulse shaper 300 and the exact embodiment of D/A switch 302 is new, however. The need to eliminate the sample and hold circuit precipitated the new design. A sample and hold circuit interposed between D/A converter 114 and the CRT would not allow the 9.6 megacycle per second data transfer rate. The problem, however, was to replace the function provided by the sample and hold circuit—the stabilization of the D/A converter output to eliminate transients. The solution found was to co-ordinate the pulses supplied to the D/A converter such that no transients occur.

The first co-ordination is provided by pulse shaper 300. It insures that all pulses have the same leading and trailing edge timing. Thus, as the pulses are simultaneously applied to ladder 304, there is no transient caused by mismatch of the leading and trailing edges. The operation of pulse shaper 300 may be explained by considering the operation of the circuit under the two input signal conditions representing the two binary levels, a negative six volts and ground. Originally capacitor 310 has no net stored charge. Therefore the voltage input to differential amplifier 315 from capacitor 310 is zero. Assuming a minus six volt signal is applied to the input labeled bit 1, diode 311 is rendered conducting, and diode 312 is rendered nonconducting. Thus the voltage upon capacitor 310 begins to charge towards the negative supply through resistors 316 and 317 and diode 314. The rate of charge of capacitor 310 may be directly controlled by varying the value of variable resistor 316. When the voltage upon capacitor 310 exceeds the thresholding voltage of Zener diode 318, an output is provided by differential amplifier 315. It is seen that the leading edge of a negative going pulse impressed upon the input labeled bit 1 may thus be shifted in time by changing the value of variable resistor 316. By varying the timing of all leading edges, they may be made to occur simultaneously and thus eliminate any leading edge transients. Similarly, assuming a negative voltage upon capacitor 310 and the impression of zero voltage upon the input labeled bit 1, diode 314 is rendered nonconducting and the voltage upon capacitor 310 discharges through diode 312 towards the positive supply voltage. When the voltage upon capacitor 310 decreases below the thresholding voltage applied to differential amplifier 315 by Zener diode 318, a second change of state of differential amplifier 315 occurs. Notice that the rate of discharge of capacitor 310 is directly controlled by resistor 319, variable resistor 320, and diode 312. Thus, the trailing edge of the input pulses may be aligned similarly to the leading edges, and no trailing edge transients occur.

The output of pulse shaper 300 of FIG. 3 is provided to D/A switch 302. A slightly negative voltage will forward bias the emitter-base junction of transistor 320 and render it conducting. This connects junction point 322 of ladder network 304 to ground through resistor 324. If the voltage provided by differential amplifier 315 of pulse shaper 300 is slightly positive, transistor 320 will be rendered nonconducting, and transistor 326 will be rendered conducting since Zener diode 328 is designed to provide a voltage drop approximating one half of the negative supply voltage. Under these conditions, the voltage appearing across the base-emitter junction of transistor 326 will forward bias it and connect junction point 322 of ladder network 304 to a precision negative voltage supply through resistor 330. Thus junction point 322 is either connected to a negative voltage or to ground—one level indicating each of the two binary states. The remaining four bits of the five bit group are similarly operated upon and provided to ladder network 304.

The output of ladder network 304 within D/A converter 114 is then operated upon by intensity correction or gamma correction circuit 116 shown in FIG. 4. This circuit is necessary to produce an output response on the CRT which will result in a linear response to the human eye. Since CRT control characteristics are non-linear, a signal applied to intensity correction circuit 116 is converted to a piece-wise non-linear response by it. The basic circuit consists of a voltage divider, resistor 400 and resistor 404. An output voltage is provided which is related to the voltage division provided by these resistances. As the input voltage becomes more negative, however, it exceeds the voltage level impressed upon the anode of diode 406 by the arm of variable resistance 410. Diode 406 then begins to conduct. When diode 406 conducts resistor 407 is placed in parallel with resistor 400, and the transfer function of the circuit is changed accordingly. That is, the voltage division ratio decreases. As the voltage becomes still more negative, the voltage at junction point 402 exceeds the voltage upon the anode of diode 408 and it also conducts. This places resistor 409 in parallel with the parallel combination of resistor 407 and 400 and still further reduces the transfer function of intensity correction circuit 116. Thus, a linearly changing voltage signal produces a three segment piece-wise nonlinear signal which matches the control characteristics of the CRT to linearly produce 32 levels of brightness.

The operation of the present invention may now be explained with detailed reference to all of the figures. Deflection information is sequentially read from memory 12 of FIG. 1 a byte at a time and provided to decoder 16. Decoder 16 then processes each byte in turn to determine whether it is a command code changing the system to the tonal mode. If the byte within decoder 16 is not a command code, it is passed through shift register accumulators 17 and 18, through D/A converters 21 and 22, through sample and hold circuits 23 and 24 through the X and Y deflection circuits 26 and 27, and to CRT 19. If the byte within decoder 16 is a command code, decoder 16 provides a logic signal which energizes tonal control 108. Tonal control 108 will first disable beam control circuits 29. Then, tonal control 108 provides the signal to control input 200 of Y deflection circuit 27 of FIG. 2 which causes Y deflection circuit 27 to provide a linear deflection signal to CRT 19, as previously explained with reference to FIG. 2. Tonal control 108 also provides a similar signal to X deflection circuit 26 to cause that circuit to provide a linear deflection also. Tonal control 108 then provides timing signals to memory 106 which allow an 80 bit word comprising 16 five bit groups to be transferred to transpose register 110. Tonal control 108 also provides timing signals to decoder 16 which synchronize the timing of the deflection information in decoder 16 with the issuance of the 80 bit word from memory 106 and insure that the actual start of the beam deflection is concurrent with the first brightness cell of the 80 bit word. One such timing signal is provided to line 210 of FIG. 2A of the patent, as described in column 6 lines 23 to 26 of the patent. Tonal control 108 next provides a timing signal to transpose register 110 which allows the parallel transfer of the entire 80 bit word to synchronize register 112. Thus far the operations have occurred at 600 kilocycles per second, corresponding to the clock track of the drum. The following sequence of timing signals from tonal control 108 allow synchronous register 112 to serially provide the 16 five bit groups to D/A converter 114 at a 9.6 megacycle per second rate. The five bit data groups serially provided by synchronize register 112 are applied to the five input lines labeled bit 1 through 5 within D/A converted 114 shown in FIG. 3. Each pulse shaper 300 has been previously aligned to cause the coincidence of leading and trailing edges of pulses applied to it as explained with reference to FIG. 3. The pulses are applied to the five D/A switches 302 in order to place either a binary "0" or a binary "1" upon each junction point of ladder 304, thus forming an analog signal output. The analog signals from D/A converter 114 then pass through intensity correction circuit 116 and control the beam intensity of CRT 19. The intensity information is thus synchronized to the incremental deflection commands such that 16 discrete sections are provided for each incremental movement of the CRT beam.

At this point, it will be obvious to those skilled in the art that many embodiments of tonal control 108 are possible to provide the correct sequence of logic timing signals.

Now that the basic teachings of the present invention have been explained, many extensions and variations will be obvious to one skilled in the art. For example, it will be realized that many types of two dimensional displays may be used in conjunction with the teachings of the present invention to replace the two dimensional line generating display of the patent referred to above. Point generating displays may also be used.

Also, while 16 brightness cells for each incremental movement of the CRT beam have been disclosed in the preferred embodiment, no limitation to this number is intended. More or fewer are envisioned in alternate embodiments.

Additionally, no limitation to the 32 discrete intensities allowable for each portion of a deflection increment is intended. Again, more or fewer may be used in alternate embodiments.

Further, many memories may be used to practice the present invention. A drum memory is preferred because of the large volume of digital information which may be stored upon it. For example, non-rotating memories such as delay lines may be used. Thus, the memory used with the present invention need not be rotating, synchronous or sequential if proper account is taken of the design, within the teachings of the present invention.

Furthermore, many techniques of providing for the value of each cell intensity other than the absolute technique of the preferred embodiment may be used. Each cell intensity may be incremented from the last cell intensity displayed, for example.

What is claimed is:

1. In conjunction with a two-dimensional cathode ray tube display where information creating the display is in a digital format stored in a digital memory, where the digital information is removed from the memory, decoded to form an analog signal, and used to control the movement of the electron beam across the face of the cathode ray tube, the improvement comprising apparatus for intensity modulating the display, comprising:
    (a) further memory apparatus for storing digital signals;
    (b) means, receiving digital signals, for digital to analog conversion;
    (c) a digital register receiving the digital signals from further memory for providing the signals to means (b) in response to a timing signal;
    (d) cathode ray tube intensity control means for receiving the signals from means (b) and for controlling the cathode ray tube intensity accordingly; and
    (e) means for controlling and timing the digital to analog conversion, the transfer of data from the further memory apparatus to the digital register, the synchronization of deflection data with intensity data and the application of the analog signal to the cathode ray tube intensity control means.

2. The apparatus of claim 1, wherein the cathode ray tube beam is moved in small increments, the summation of many increments forming a display, wherein:
    (aa) the further memory apparatus is adapted to store a plurality of intensity words, one intensity word for each beam increment, each intensity word comprising a plurality of groups of binary information for providing a plurality of intensity cells during each beam increment, each intensity cell being capable of a plurality of intensity levels in accordance with the number of bits within each binary group;

(bb) the register further comprises a digital register adapted to accept all bits of an intensity word in parallel and serially provide the groups of bits to means (b) in response to timing signals from means (e); and (cc) means (e) comprises means for providing digital timing signals for allowing all groups of bits comprising a single intensity word to modulate the cathode ray tube beam during a single beam increment.

3. The apparatus of claim 1, wherein the register comprises means for receiving a plurality of bits of digital information in parallel and for providing the information in groups of bits, the groups being provided serially.

4. The apparatus of claim 3, wherein the register comprises a digital register capable of accepting at least 80 bits of digital information in parallel and serially providing at least 16 groups of five bits each.

5. The apparatus of claim 1, wherein means (e) provides a timing signal for coordinating the analog information from the intensity control means and the cathode ray tube beam movement for providing a plurality of intensity changes during an incremental beam excursion.

6. An electronic display for displaying digitally encoded data, comprising in combination:
   (a) a cathode ray tube;
   (b) first means for providing beam deflection on a first axis of the cathode ray tube in response to first digitally encoded data;
   (c) second means for providing beam deflection on a second axis of the cathode ray tube in response to second digitally encoded data;
   (d) third means for controlling the local brightness of the cathode ray tube in response to third digitally encoded data, comprising: a digital register for holding the third digitally encoded data received from means (g);
   (e) digital to analog conversion means, receiving digital information from the register, for providing analog signals corresponding to the digital signals received;
   (f) means, receiving the analog signals from the digital to analog means, for controlling the local brightness of the cathode ray tube in response to the analog signals; and
   (g) means for supplying the first, second, and third digitally encoded data to the first, second, and third means.
   (h) means for controlling and timing the first, second, and third means.

7. The apparatus of claim 6, further comprising:
   (aa) a disc memory for providing the first and the second digitally encoded data; and
   (bb) a drum memory for providing the third digitally encoded data.

8. The apparatus of claim 6, wherein the digitally encoded data is provided by a rotating drum adapted to store magnetic signals, the first data being provided from a first region of the drum, the second data being provided from a second region of the drum, and the third data being provided from a third region of the drum.

9. A three-dimensional display where the third dimension is formed by modulating the local brightness of a two-dimensional display, and where the two-dimensional display is of the type in which digital information is read from a memory and used to sequentially deflect a cathode ray tube beam along variable length and direction increments, comprising:
   (a) a further memory for storing binary intensity information in the form of intensity words, each intensity word comprising groups of bits;
   (b) a beam control circuit for receiving analog information and modulating the intensity of the cathode ray tube beam accordingly;
   (c) a register for simultaneously receiving all groups comprising an intensity word from the further memory and for serially providing the intensity word one group at a time;
   (d) means for serially receiving the groups of bits from the register and for providing corresponding analog signals; and
   (e) timing means for providing timing signals to the further memory, means (d), and the two-dimensional display for allowing all groups of an intensity word to linearly modulate the cathode ray tube beam during an incremental deflection.

10. The apparatus of claim 9, wherein means (d) comprises a digital to analog converter.

11. The display apparatus which comprises:
   (a) means for converting varying digital data representative of beam intensity into an analog intensity signal;
   (b) means for applying the intensity signal to a cathode ray tube;
   (c) means for controlling and timing digital to analog conversion, synchronization of deflection data with intensity data, and application of the intensity signal to the cathode ray tube;
   (d) further memory means for storing intensity data;
   (e) means for entering intensity data in and retrieving intensity data from the further memory means.

References Cited

UNITED STATES PATENTS

| | | | |
|---|---|---|---|
| 3,336,587 | 8/1967 | Brown | 340—324 |
| 3,465,295 | 9/1969 | Witt et al. | |

RODNEY D. BENNETT, Jr., Primary Examiner

T. H. TUBBESING, Assistant Examiner

U.S. Cl. X.R.

315—24; 340—324